United States Patent Office 2,917,493
Patented Dec. 15, 1959

2,917,493

POLYEPOXIDE COMPOSITIONS

Benjamin Phillips, Charleston, Charles W. McGary, Jr., South Charleston, and Charles T. Patrick, Jr., St. Albans, W. Va., assignors to Union Carbide Corporation, a corporation of New York No Drawing. Application August 8, 1957
Serial No. 676,949

25 Claims. (Cl. 260—78.4)

This invention relates to polyepoxide compositions. In one aspect this invention relates to curable, polymerizable compositions comprising divinylbenzene dioxide and polycarboxylic acid compounds, and to the partially cured and cured compositions resulting therefrom.

This application is a continuation-in-part of copending application Serial No. 676,913, entitled "Epoxide Compositions," by B. Phillips, C. W. McGary and C. T. Patrick, Jr., filed August 8, 1957, and assigned to the same assignee as the instant application.

The polymerizable compositions of this invention are low-viscosity, homogeneous liquids at room temperatures or at high temperatures. These compositions can be easily handled in such resin-forming operations as coating, laminating, bonding, molding, casting, potting, calendering and the like. They are capable of accepting solid materials, such as fillers and pigments, for providing various effects in physical properties and coloration. With or without such added solid materials, they can be made to fill small intricacies of molds without the necessity of applying high pressures or heating to high temperatures, although such measures can be employed, if desired. The compositions also can be easily spread, brushed, or sprayed by many techniques available in the paint, lacquer, and varnish industries for making coatings and finishes. Little, if any, shrinkage occurs in curing to the resin. The polymerizable compositions are capable of being accurately shaped by molds having intricate molding surfaces and cured to resins carrying exact details of such molding surfaces. They can be also advantageously employed in the potting of such fragile articles as electronic components.

The cured compositions, i.e., resins, of this invention are transparent, water-resistant solids. These resins vary from soft and flexible to hard and rigid products, depending upon the proportion, the functionality, and the chain-length of the polycarboxylic acid compound employed. The hard, infusible, rigid, thermoset resins are insoluble in most organic vehicles. These resins can be machined to desired shapes and configurations and can be polished to provide appealing finishes.

Many of the curable, polymerizable compositions of this invention are mobile liquids possessing viscosities as low as 50 centipoises at approximately 25° C. and are particularly capable of being easily prepared and conveniently applied to form bubble-free resins. The low viscosity of the curable compositions of this invention and the bubble-free resins obtained therefrom on curing stand in contradistinction to the commercial epoxide systems. The commercial epoxide resins such as those prepared from mixtures of carboxylic acids and polyglycidyl ethers of polyhydric phenols have achieved a degree of usefulness in the synthetic resins but are limited by certain inherent characteristics to a restricted field of application. The viscosities of these mixtures are relatively high (of the order of 9,000 centipoises, and higher, at 25° C. without solvents or diluents) as to preclude easy handling and application. Although diluents can be used in the preparation of commercial resins, there are the disadvantages of higher cost and low strength properties of resins prepared therefrom. Mixtures of acids and polyglycidyl ethers of polyhydric phenols have been found heretofore to have extremely slow curing rates. In contrast, it has been observed that the curable compositions of the instant invention exhibit more practical and faster rates of cure.

The curable, polymerizable compositions of this invention also can be partially reacted at elevated temperatures to form viscous liquids or soft gels which on cooling, for example, to room temperature, can be viscous liquids or solids capable of being powdered or granulated and dissolved in a suitable organic solvent such as ethyl acetate or methyl isobutyl ketone and applied as heat-curable coatings. These partially reacted curable compositions can be also used as molding powder compositions which can be converted to infusible products by the application of heat and pressure.

Accordingly, one or more of the following objects will be achieved by the practice of this invention.

It is an object of this invention to prepare novel curable, partially cured, and cured compositions comprising divinylbenzene dioxide and a polycarboxylic acid compound. It is another object of this invention to prepare novel curable compositions comprising divinylbenzene dioxide and a polycarboxylic acid compound which are mobile liquids having viscosities as low as 50 centipoises at room temperature, i.e., about 25° C. It is a further object of this invention to prepare novel curable and partially cured compositions comprising divinylbenzene dioxide and a polycarboxylic acid compound which when dissolved in a suitable organic solvent are useful in the fields of coatings, adhesives, and the like. A still further object of this invention is directed to a novel process of reducing the gelation period of a curable composition comprising divinylbenzene dioxide and a polycarboxylic acid compound. A yet further object of this invention is to prepare novel intermediate reaction products resulting from the partial reaction of a composition comprising divinylbenzene dioxide and a polycarboxylic acid compound. Another object of this invention is directed to the preparation of novel curable, partially cured, and cured compositions comprising divinylbenzene dioxide and a polycarboxylic acid compound which can be modified by polycarboxylic acid anhydrides to give a wide variety of useful properties and characteristics to said compositions. Numerous other objects of the present invention will become apparent to those skilled in the art from a consideration of the instant specification.

By the term "polycarboxylic acid compound," as used herein, is meant polycarboxylic acids and polycarboxy polyesters. The term "polycarboxy polyesters" is defined herein at a more appropriate section in this specification.

In one embodiment, this invention is directed to curable, polymerizable compositions comprising (a) divinylbenzene dioxide characterized by the following formula:

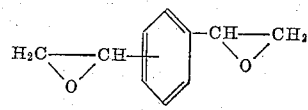

and (b) a polycarboxylic acid compound in proportions so as to provide from about 0.3 to 1.25 carboxyl equivalents of acid compounds per epoxy equivalent of diepoxide. These diepoxide-acid compound systems can be further modified, so as to obtain a variety of useful physical properties, by the inclusion or addition of a polycarboxylic acid anhydride, in an amount so as to provide up to 0.75 carboxyl equivalent of polycarboxylic acid anhydride per epoxy equivalent of diepoxide. Any of the three isomeric forms of divinylbenzene dioxide, i.e., ortho-, meta-, or para-divinylbenzene dioxide, or mixtures thereof, can be employed as starting material for the preparation of the novel compositions of this invention.

The polymerizable, curable divinylbenzene dioxide-polycarboxylic acid compound systems, modified and unmodified with a polycarboxylic acid anhydride, can be expressed as compositions comprising (a) divinylbenzene dioxide, (b) a polycarboxylic acid compound in an amount having y carboxyl equivalents per epoxy equivalent of said diepoxide, and (c) a polycarboxylic acid anhydride in an amount having x carboxyl equivalents per epoxy equivalent of said diepoxide, wherein y is a number in the range from about 0.3 to 1.25, preferably from about 0.3 to 1.0; x is a number in the range from 0.0 to 0.75; the sum of y plus x is not greater than 1.25, preferably not greater than 1.0; and x/y is less than 1.0.

The proportions of the reactants are preferably expressed in terms of available carboxyl groups or carboxyl equivalent per available epoxy group or epoxy equivalent. Accordingly, by the term "carboxyl equivalent" as herein employed, is meant the number of carboxyl groups contained by an amount of polycarboxylic compound. For example, the "carboxyl equivalent" of a dicarboxylic acid is two. In the case of a dicarboxylic acid anhydride, the term "carboxyl equivalent" is meant to indicate the number of carboxyl groups which would be contained by an amount of the corresponding dicarboxylic acid. Thus, for example, one mole of a dicarboxylic acid anhydride would have a "carboxyl equivalent" of two. Also, as employed herein, the term "epoxy equivalent" is intended to represent the number of epoxy groups,

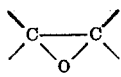

contained by an amount of epoxide compound. Thus, in the diepoxide-polycarboxylic acid compound, modified or unmodified by the addition of a polycarboxylic acid anhydride, the terms y and x are employed to signify carboxyl equivalents of the acid compound and anhydride, respectively, per epoxide equivalent. Thus, since it has been discovered that useful compositions are obtained by employing amounts of polycarboxylic acid compound and divinylbenzene dioxide so as to provide from about 0.3 to 1.25 carboxyl equivalents of acid compounds per epoxy equivalent of diepoxide, and consequently, y will be a number in the range from about 0.3 to 1.25. Upon the addition, if desired, of a modifying polycarboxylic acid anhydride, the amount of polycarboxylic acid compound must, of course, be correspondingly decreased. Thus, it has been discovered that useful compositions are obtainable by the addition to the diepoxide-acid compound systems of a polycarboxylic acid anhydride in an amount so as to provide from 0.0 to 0.75 carboxyl equivalent of acid anhydride per epoxy equivalent of diepoxide, and, therefore, x will be a number in the range from 0.0 to 0.75. The sum of y plus x is not greater than 1.25, since it has been observed that products obtained by employing more than about 1.25 carboxyl groups per epoxy groups in the system are unsuitable because they are heterogeneous in nature. The lower limit of the sum of y plus x is preferably not less than 0.3, since it has been observed that products obtained by employing less than about 0.3 carboxyl group per epoxy group in the system are undesirable because they are liquids of varying viscosity or soft and tacky solids. In addition, the ratio of x/y is less than 1.0 since the polycarboxylic acid compound is a major component of the system. The use of monocarboxylic acids as a component of the curable compositions of this invention are unsatisfactory since liquid products of varying viscosity, or tacky products, are obtained on curing. It is particularly preferred to employ divinylbenzene dioxide and polycarboxylic acid in amounts which provide from about 0.3 to about 1.0 carboxyl groups of acid per epoxy group of diepoxide. Within this preferred range hard, tough, infusible resins are obtained on curing the curable compositon.

The curable compositions of this invention, modified or unmodified with a polycarboxylic acid anhydride, can be readily prepared by mixing a polycarboxylic acid compound with divinylbenzene dioxide. It is preferred to agitate the curable composition, for example, by stirring or other suitable means, so as to obtain a homogeneous mixture. When a solid or highly viscous polycarboxylic acid compound is employed heating is advantageous in facilitating the formation of a solution. In any event the application of heat should not be prolonged to the extent that appreciable curing takes place. Catalysts can be added at this point or at any point prior to curing or not at all, as desired.

The curable compositions of this invention can be heated to a temperature in the range from about 25° C. to about 250° C., preferably from about 50° C. to about 200° C., for a period of time to produce hard, infusible resin products. Temperatures higher than 250° C. can be used although some discoloration which may not be desired may be brought about in the resins thus formed. The time for effecting the complete cure will be governed, to an extent, on several factors such as the particular polycarboxylic acid compound employed, the proportions of divinylbenzene dioxide and acid compound used, the inclusion of a polycarboxylic acid anhydride modifier, the temperature for effecting the cure, the use of a catalyst in the system, and other considerations. In general, the time for effecting the complete cure can vary from several minutes to as long as 24 hours and longer, depending upon the correlation of such factors as noted above. The polycarboxylic acid compounds derived from the more acidic acids, such as maleic acid, generally cure the fastest.

A higher curing temperature generally will provide a resin in less time than a lower curing temperature. One preferable method is to heat the curable compositions to a temperature within the range from about 50° C. to 150° C. to first partially cure the composition. A temperature from about 100° C. to 200° C. then can be used to complete the cure. However, any one or combination of two or more temperatures within the specified range of 25° C. to 250° C. can be employed, if desired, to effect the full cure. For casting purposes the preferred minimum temperature is that at which the reactants form a uniform melt, whereas for coatings and the preparation of laminates, the use of solvents will allow the use of lower temperatures.

While not wishing to be held to any particular theory or mechanics of reaction, it is believed that in curing, one epoxy group of divinylbenzene dioxide can be monofunctional when reacted with polycarboxylic acid compounds, e.g., polycarboxylic acids, such that, one carboxy group of the acid reacts with a single epoxy group to form an ester linkage, i.e., $$-O-\overset{O}{\underset{\|}{C}}-$$

interconnecting the acid molecule with the epoxide molecule, and a hydroxyl group attached to said epoxide molecule. This reaction can be represented by the equation.

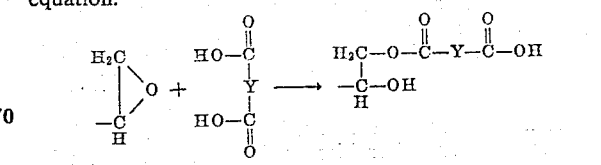

wherein

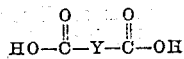

represents a polycarboxylic acid. A hydroxyl group such as that formed by this reaction and which is attached to the epoxide molecule is believed to be capable of reacting with an epoxy group, a carboxy group, or an oxydicarbonyl group of a polycarboxylic acid anhydride to bring about cross-linking. Flexibilities of the resins have been found to be controllable through the selection and use in compositions from which they are made of various polycarboxylic acids having different numbers of carboxy groups and different numbers of atoms in chains connecting the carboxy groups. It has been found that the compositions of this invention containing polycarboxylic acids having, for example, more than two carboxy groups tend to form hard, rigid resins. In general, compositions containing polycarboxylic acids having higher number of carboxy groups form harder and more rigid resins than those compositions containing polycarboxylic acids with lower numbers of carboxy groups. It has furthermore been found that the compositions of this invention which contain dicarboxylic acids having greater numbers of atoms in the shortest chains connecting the carboxy groups tend to form more flexible resins than those compositions which contain dicarboxylic acids with fewer atoms in the shortest chains connecting the carboxy groups. It is possible, therefore, through selection and use of polycarboxylic acids in the compositions to produce resins having properties to fit the particular applications.

Similarly, it is believed that during the cure of the polymerizable or curable compositions of this invention which are modified with polycarboxylic acid anhydrides, one epoxy group of divinylbenzene dioxide molecule can be difunctional with the polycarboxylic acid anhydrides, such that, the equivalent of two carboxy groups of the anhydride reacts with a single epoxy group to form two ester linkages,

interconnecting the epoxide molecule with two anhydride molecules. This reaction can be typified by the general equation:

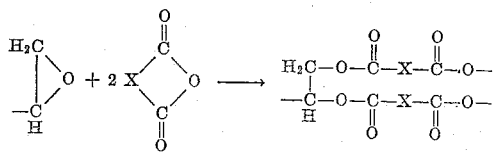

wherein

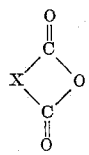

represents a polycarboxylic acid anhydride. This reaction of polycarboxylic acid anhydrides and divinylbenzene dioxide is believed to provide cross-linking which increases the rigidity of resins formed from polymerizable compositions containing them. Additionally, some degree of etherification of epoxy groups of different divinylbenzene dioxide molecules is believed to occur during curing.

The resins of this invention can be characterized as having recurring interconnected units represented by the following formula:

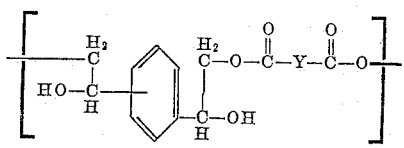

wherein Y is a polycarboxylic acid residue. By the term "polycarboxylic acid residue," as used herein, is meant a polyvalent group which can be regarded as the residue of a polycarboxylic acid molecule to which two or more carboxy groups, —COOH, are attached to constitute said polycarboxylic acid molecule. Thus, a dicarboxylic acid molecule consists of the divalent group or the dicarboxylic acid residue to which two carboxy groups are attached.

Divinylbenzene dioxide is not a new compound. One preferred method of preparing divinylbenzene dioxide is the reaction of ortho-, meta-, or para-divinylbenzene with an excess peracetic acid solution in an inert solvent such as acetone or ethyl acetate at approximately 70° C., followed by isolation of the diepoxide product by fractional distillation. Other modes of preparing divinylbenzene dioxide are more fully described in the literature.

Polycarboxylic acid compounds useful in producing the resins of this invention include the polycarboxylic acids having the following structural formula:

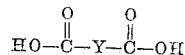

wherein Y represents a single bond or a divalent group composed of one carbon atom or groups of carbon atoms interconnected by single or multiple bonds, and to which groups such as hydrogen, alkyl, carboxy, chloro, bromo, cyclic groups and the like or combinations thereof can be attached. Y can also represent a divalent group containing groups of carbon atoms interconnected by single or multiple bonds and esters linkages, i.e.,

Y can represent cyclic groups such as phenylene, cyclohexylene, cyclohexenylene, and the like. Mixtures of polycarboxylic acids, or only one polycarboxylic acid, as desired, can be employed.

Illustrative polycarboxylic acids which are useful in the preparation of the novel compositions include aliphatic, aromatic and cycloaliphatic dicarboxylic acids such as for example, oxalic acid, malonic acid, succinic acid, glutaric acid, adipic acid, pimelic acid, suberic acid, azelaic acid, sebacic acid, alkylsuccinic acids, alkenylsuccinic acids, maleic acid, fumaric acid, itaconic acid, citraconic acid, mesaconic acid, glutaconic acid, muconic acid, ethylidenemalonic acid, isopropylidenemalonic acid, allylmalonic acid, 1,2-cyclohexanedicarboxylic acid, 1,4-cyclohexanedicarboxylic acid, 2-carboxy-2-methyl-cyclohexaneacetic acid, phthalic acid, isophthalic acid, terephthalic acid, 1,8-naphthalenedicarboxylic acid, 3-carboxycinnamic acid, 1,2-naphthalenedicarboxylic acid and tetrahydrophthalic acid. Preferred aliphatic dicarboxylic acids include aliphatic dibasic acids containing from five through ten carbon atoms. Other suitable polycarboxylic acid compounds include tricarboxylic acids such as 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid and the like. Polycarboxylic acids which have melting points below about 250° C. are suitable; those acids possessing melting points below about 200° C. are preferred.

Among the polycarboxylic acid compounds which can also be used in the compositions are compounds containing ester groups and more than one free carboxy group and can be aptly termed polycarboxy polyesters of polycarboxylic acids, such as those previously listed, or the corresponding anhydrides of said acids, esterfied with polyhydric alcohols. By the term "polycarboxy polyester," as used herein, is meant a polyester containing more than one carboxy group per molecule. These polycarboxy polyesters can be prepared by known condensation procedures, employing mole ratios favoring greater than equivalent amounts of polycarboxylic acid or anhydride. More specifically, the amount of polycarboxylic acid or anhydride employed in the esterification reaction should contain more carboxy groups than are required to react with the hydroxyl groups of the amount of polyhydric alcohol reactant present. In forming polycarboxy polyesters that are useful in the compositions of this invention, it is preferable to use polycarboxylic acids such as those previously named or the corresponding anhydrides. In general, polycarboxy polyesters which have melting points below about 250° C. are satisfactory; those polycarboxy polyesters possessing melting points below about 200° C. are preferred.

Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, 1,5-pentanediol, 2,4-pentanediol, 2,3-dimethyltrimethylene glycol, 1,4-hexanediol, 1,5-hexanediol, 1,6-hexanediol, 2,5-hexanediol, 3-methyl-1,5-pentanediol, 2-methyl-2,5-pentanediol, 3-methyl-2,5-pentanediol, 2,2 - diethyl-1,3 - propanediol, 2-ethyl - 1,3 - hexanediol, 2,5-dimethyl-2,5-hexanediol, 1,12-octadecanediol, 1-butene-3,4-diol, 2-butene-1,4-diol, 2-butyne-1,4-diol, 2,5-dimethyl - 3 - hexyne - 2,5-diol, and the like; trihydric alcohols such as glycerol, trimethylolmethane, 1,2,6-hexanetriol, 1,1,1-trimethylolpropane, and the like; tetrahydric alcohols such as pentaerythritol, diglycerol, and the like; and higher polyhydric alcohols such as pentaglycerol, dipentaerythritol, polyvinyl alcohols and the like. Other polyhydric compounds can be prepared by the reaction of epoxides, e.g., 2,2'-bis(p-hydroxyphenyl)propane, and reactive hydrogen-containing organic compounds, e.g., polycarboxylic acids, polyhydric compounds and the like. In forming polycarboxy polyesters that can be employed in the novel compositions it is preferable to use dihydric, trihydric or tetrahydric, aliphatic or oxa-aliphatic alcohols.

The mole ratios in which the polycarboxylic acid or anhydride can be reacted with polyhydric alcohols in preparing polycarboxy polyesters useful in the compositions are those which provide polyesters having more than one free carboxy group per molecule. In the case of trifunctional and tetrafunctional reactants in the esterification reaction, the mole ratios of the respective reactants must be such as to avert gelation. The mole ratio ranges of dicarboxylic acid to polyhydric alcohols that have been found to provide polycarboxyl polyesters which can be used in the compositions of this invention are presented in Table I.

TABLE I

| Polyhydric Compound | Mole Ratio of Dicarboxylic Acid or Anhydride to Polyhydric Compound |
|---|---|
| Trihydric Compound | 2.2 to 3.0. |
| Tetrahydric Compound | 3.3 to 4.0. |

It is preferred, however, to employ polycarboxy polyesters prepared from dicarboxylic acids or anhydrides and polyhydric alcohols in the mole ratios specified in Table II.

TABLE II

| Polyhydric Compound | Mole Ratio of Dicarboxylic Acid or Anhydride to Polyhydric Compound |
|---|---|
| Trihydric Compound | 2.5 to 3.0. |
| Tetrahydric Compound | 3.5 to 4.0. |

The polycarboxylic polyesters described above can be obtained by condensing, in accordance with known procedures, a polyhydric alcohol and a polycarboxylic acid or anhydride. This condensation reaction may be conducted for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyester has been obtained.

Among the polycarboxylic acid anhydrides which can be employed to modify the properties and characteristics of the divinylbenzene dioxide-polycarboxylic acid compound systems include the polycarboxylic acid anhydrides having the following structural formula:

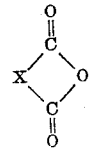

wherein X represents two or more carbon atoms interconnected by single or double bonds and to which such groups as hydrogen, alkyl, nitro, chloro, iodo, bromo, cyclic groups and the like or combinations thereof can be attached. X can also represent groups containing carbon atoms interconnected by single or double bonds and oxydicarbonyl groups, i.e.

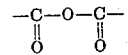

interconnecting the carbon atom groups to which such other groups as previously mentioned can be attached. X can also represent such cyclic groups as phenylene, cyclohexylene, and the like which can have one or more oxydicarbonyl groups attached thereto. One polycarboxylic acid anhydride or a mixture of two or more, as desired, can be used as modifiers in the polymerizable compositions.

The polycarboxylic acid anhydrides which can be used as modifiers in the preparation of the novel compositions include aliphatic, aromatic and cycloaliphatic acid anhydrides. The preferred anhydrides are the dicarboxylic acid anhydrides and preferably the hydrocarbon dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, citraconic anhydride, 4-nitrophthalic anhydride, 1,2-naphthalic anhydride, 2,3-naphthalic anhydride, 1,8-naphthalic anhydride, tetrabromophthalic anhydride, tetraiodophthalic anhydride. Mixtures of anhydrides, polymeric anhydrides or mixed polymeric anhydrides of sebacic, adipic, pimelic, cyclohexane-1,4-dicarboxylic, terephthalic and isophthalic acids are also useful as modifiers in the preparation of the novel compositions. Acid dianhydrides such as 1,2,4,5-benzenetetracarboxylic dianhydride likewise are effective modifiers. Polycarboxylic acid anhydrides which have melting points below about 250° C. are satisfactory; those anhydrides possessing melting points below about 200° C. are preferred.

In another embodiment of our invention acidic catalysts can be employed in the curable divinylbenzene dioxide-polycarboxylic acid compound systems, modified or unmodified with a polycarboxylic acid anhydride, to increase the curing rate and reduce the gelation period of said systems. Catalyst which are effective include the mineral acids, e.g., sulfuric acid, perchloric acid, phosphoric acid, polyphosphoric acid, and the like; the sulfonic acids, e.g., ethylsulfonic acid, benzenesulfonic acid, toluenesulfonic, lower alkyl-substituted aromatic sulfonic acids, and the like; the metal halide Lewis acids, e.g., boron trifluoride, stannic chloride, zinc chloride, ferric chloride, aluminum chloride, boron trifluoride-piperidine complex, boron trifluoride-monoethylamine complex, boron trifluoride-1,6-hexanediamine complex, boron trifluoride-dimethyl ether complex, boron trifluoride-diethyl ether complex, and the like.

Uniform dispersions of catalyst in the curable compositions of this invention prior to curing have been found to be desirable in order to minimize local curing around catalyst particles. Agitation of the curable compositions as the catalyst is added is sufficient when the catalyst is miscible with the composition. When the two, i.e., catalyst and curable composition, are immiscible, the catalyst can be added as a solution in an organic solvent. Typical solvents for the catalysts include organic ethers, e.g., diethyl ether, methyl propyl ether and the like; organic esters, e.g., methyl acetate, ethyl propionate, and the like; organic ketones, e.g., acetone, cyclohexanone, and the like; organic alcohols, e.g., methanol, propylene glycol, and the like. Broadly, catalytic quantities of catalyst are sufficient to effectively reduce the gelation period. Catalyst concentrations up to 5.0 weight percent, and higher, based on the weight of divinylbenzene dioxide, have been found to be desirable. In general, a catalyst concentration in the range from about 0.001 to about 5.0 weight percent, based on the weight of the dioxide, is sufficient.

Another embodiment of this invention is directed to curable and partially cured compositions, i.e., divinylbenzene dioxide and polycarboxylic acid compound system, modified or unmodified with a polycarboxylic acid anhydride, with or without the use of a catalyst, said compositions being dissolved in a suitable organic solvent such as xylene, methyl isobutyl ketone, butyl acetate, ethyl acetate, toluene, amyl acetate, and the like. The compositions dissolved in the above-exemplary list of solvents can be used as, for example, surface coating which can be subsequently heat cured to hard, tough, scratch-resistant coatings.

The proportion of partially cured resin to solvent will depend on various factors such as the particular mixture being cured, the degree or extent of the partial cure, the particular organic solvent employed, and other considerations. In general, a solution comprising from about 10 to about 90 weight percent of the partially cured resin, based on the total weight of partially cured resin and solvent, is suitable; from about 40 to 70 weight percent of the partially cured resin, based on the total weight of partially cured resin and solvent, is preferred. Moreover, the uncured compositions can be dissolved in the solvents exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to insure a more uniform coating on the surface.

In the following illustrative examples, Barcol hardness values were determined by the use of Barcol Impressor GYZJ-934-1 at a temperature of 25° C. The divinylbenzene dioxide employed ranged in purity from 65.8 to 74.0 weight percent with the impurity substantially being ethylstyrene oxide. The proportions indicated in each example were calculated on the basis of the purity of the diepoxide as determined by the pyridine hydrochloride method of analysis. Unless otherwise indicated the examination or description of the resins were conducted at room temperature, i.e., 25° C.

*Example 1*

Divinylbenzene dioxide (0.81 gram) of 65.8 weight percent purity was admixed with adipic acid (0.55 gram) so as to provide a mixture containing 1.15 carboxyl groups of acid per epoxy group of diepoxide. The resulting mixture was heated to 120° C. and maintained thereat for 4.2 hours during which time a gel was formed. After a post cure of 6 hours at 160° C., there was obtained a yellow colored, soft, flexible resin product.

*Example 2*

A mixture comprising 0.81 gram of divinylbenzene dioxide of 65.8 weight percent purity and 0.87 gram of an adduct of three moles of succinic anhydride with one mol of glycerol (neutralization equivalent of 120) [1] was prepared. This mixture contained amounts of diepoxide and adduct which provided 1.1 carboxyl groups per epoxy group. The resulting mixture was heated to 120° C. and maintained thereat for 1.25 hours during which time a gel was formed. After a post cure of 6 hours at 160° C., there was obtained a tough, yellow colored, flexible resin with a Barcol hardness of 0.

*Examples 3–10*

Eight mixtures, each containing 1.10 grams of divinylbenzene dioxide of 74 weight percent purity and various proportions of adipic acid were prepared. The resulting mixtures were maintained at 100° C. from 8 to 27 hours to ascertain the times for gelation to occur. These mixtures were subsequently post cured for 6 hours at 160° C. The results are set out in Table III below:

TABLE III

| Example Number | Adipic Acid, Grams | Equivalent Ratio [1] | Gel Time at 100° C., Hours | Cure at 100° C., Hours | Resin Description |
|---|---|---|---|---|---|
| 3 | 0.07 | 0.1 | No Gel | 27 | Yellow, viscous liquid. |
| 4 | 0.15 | 0.2 | No Gel | 27 | Yellow, firm, tacky. |
| 5 | 0.22 | 0.3 | 4 | 8 | Yellow, tough, Barcol, 0. |
| 6 | 0.29 | 0.4 | 2.67 | 8 | Yellow, tough, Barcol, 10. |
| 7 | 0.37 | 0.5 | 0.92 | 8 | Yellow, tough, Barcol, 7. |
| 8 | 0.58 | 0.8 | 22 | 26 | Yellow, tough, Barcol, 0 |
| 9 | 0.73 | 1.0 | No Gel | 26 | Yellow, tough, Barcol, 0. |
| 10 | 0.92 | 1.25 | No Gel | 26 | Yellow, firm, flexible. |

[1] Ratio of carboxyl groups of acid per epoxy group of diepoxide.

*Example 11*

A mixture comprising 1.10 grams of divinylbenzene dioxide of 74 weight percent purity and 0.26 gram of glutaric acid was prepared. This mixture contained amounts of acid and diepoxide which provided 0.4 carboxyl group per epoxy group. The resulting mixture was heated to 100° C. for 60 minutes at which time gelation occurred. After a total cure of 5.5 hours at 100° C. plus 6 hours at 160° C., there was obtained a yellow colored, tough resin having a Barcol hardness of 35.

*Example 12*

A mixture comprising 1.10 grams of divinylbenzene dioxide of 74 weight percent purity and 0.86 gram of an adduct of two mols of phthalic anhydride with 1 mol of ethylene glycol (neutralization equivalent of 145) was prepared. This mixture contained amounts of diepoxide and adduct which provided 0.4 carboxyl group per epoxy group. The resulting mixture was heated to 100° C. and maintained thereat for 5.5 hours. Gelation occurred after two minutes at this temperature. After a post cure for 6 hours at 160° C., there was obtained a yellow colored, slightly brittle resin.

[1] "Identification of Organic Compounds," by R. L. Shriner and R. C. Fuson, John Wiley and Sons, Inc., 3rd edition, 1948, page 128.

Example 13

Divinylbenzene dioxide (1.1 grams) of 74 weight percent purity was admixed with sebacic acid (0.40 gram) so as to provide a mixture containing 0.4 carboxyl group of acid per epoxy group of diepoxide. The resulting mixture was heated to 100° C. and maintained thereat for 5.5 hours. Gelation occurred after 5 hours at this temperature. After a total cure of 5.5 hours at 100° C. plus 6 hours at 160° C., there was obtained an amber colored, tough resin having a Barcol hardness of 0.

Example 14

A mixture comprising 1.10 grams of divinylbenzene dioxide of 74 weight percent purity, 0.37 gram of adipic acid, and 0.19 gram of phthalic acid anhydride was prepared. The mixture contained amounts of divinylbenzene dioxide, acid and anhydride which provided 0.5 carboxyl group of acid and 0.25 carboxyl group of anhydride per epoxy group of diepoxide. The resulting mixture was heated to 100° C.; gelation occurred after one minute at 100° C. The mixture was maintained at 120° C. for 4–5 hours plus 6 hours at 160° C. There was obtained an amber colored, tough resin having a Barcol hardness of 31.

Example 15

A mixture comprising 1.10 grams of divinylbenzene dioxide of 74 weight percent purity, 0.76 gram of sebacic acid, and 0.12 gram of maleic anhydride. The mixture contained amounts of divinylbenzene dioxide, acid and anhydride which provided 0.75 carboxyl group of acid and 0.25 carboxyl group of anhydride per epoxy group of diepoxide. The resulting mixture was heated to 100° C.; gelation occurred within 75 minutes at 120° C. The mixture was maintained at 100° C. for 4–5 hours plus 6 hours at 160° C. There was obtained a yellow colored, tough resin having a Barcol hardness of 0.

Example 16

A mixture comprising 1.10 grams of divinylbenzene dioxide of 74 weight percent purity, 0.23 gram of maleic acid, and 0.17 gram of glutaric anhydride was prepared. The mixture contained amounts of divinylbenzene dioxide, acid and anhydride which provided 0.4 carboxyl group of acid and 0.3 carboxyl group of anhydride per epoxy group of diepoxide. The resulting mixture was heated to 100° C., gelation occurred within minutes at 100° C. The mixture was maintained at 120° C. for 4–5 hours plus an additional 6 hours at 160° C. There was obtained a yellow colored, tough resin possessing a Barcol hardness of 37.

Example 17

Divinylbenzene dioxide (1.10 grams) of 74 weight percent purity, an adduct of 1 mol of glycerol with 3 mols of succinic anhydride (0.60 gram), and methyltetrahydrophthalic anhydride (0.33 gram) were admixed so as to provide 0.5 carboxyl group of acid and 0.4 carboxyl group of anhydride per epoxy group of diepoxide. The resulting mixture was then heated to 100° C.; gelation occurred within 75 minutes at 120° C. The mixture was maintained at 100° C. for 4–5 hours plus 6 hours at 160° C. The resulting product was an amber colored, tough resin having a Barcol hardness of 49.

Example 18

A mixture was prepared from 1.1 grams of divinylbenzene dioxide (74 weight percent purity) and 1.1 grams of adipic acid. This mixture provided 1.5 carboxyl groups per epoxy group. The resulting mixture was allowed to stand at room temperature, i.e., approximately 25° C., for one hour and then was heated to 120° C. and maintained thereat for 22–23 hours during which time gelation did not occur. The temperature subsequently was raised to 160° C. for an additional six-hour period. Upon cooling to room temperature, a pale amber, soft, flexible, opaque product was obtained. The term "opaque" signifies that the product mass was heterogeneous in nature with crystals dispersed throughout.

Example 19

A mixture was prepared from 1.1 grams of divinylbenzene dioxide (74 weight percent purity) and 1.28 grams of adipic acid. This mixture provided 1.75 carboxyl groups per epoxy group. The resulting mixture was allowed to stand at room temperature, i.e., approximately 25° C., for one hour and then was heated to 120° C. and maintained thereat for 22–23 hours during which time gelation did not occur. The temperature subsequently was raised to 160° C. for an additional six-hour period. Upon cooling to room temperature, a pale amber, soft, flexible opaque product was obtained.

Example 20

A mixture was prepared from 1.1 grams of divinylbenzene dioxide (74 weight percent purity) and 0.07 gram of glutaric acid. This mixture provided 0.1 carboxyl group per epoxy group. The resulting mixture was allowed to stand at room temperature, i.e., approximately 25° C., for one hour and then was heated to 120° C. and maintained thereat for 22–23 hours during which time gelation did not occur. The temperature subsequently was raised to 160° C. for an additional six-hour period. Upon cooling to room temperature, an amber, soft, flexible product was obtained.

Example 21

A mixture was prepared from 1.1 grams of divinylbenzene dioxide (74 weight percent purity) and 1.5 grams of glutaric acid. This mixture provided 2.3 carboxyl groups per epoxy group. The resulting mixture was allowed to stand at room temperature, i.e., approximately 25° C., for one hour and then was heated to 120° C. and maintained thereat for 22–23 hours during which time gelation did not occur. The temperature subsequently was raised to 160° C. for an additional six-hour period. Upon cooling to room temperature, an amber, soft, tacky, opaque product was obtained.

Example 22

A mixture was prepared from 1.1 grams of divinylbenzene dioxide (74 weight percent purity) and 0.1 gram of sebacic acid. This mixture provided 0.1 carboxyl group per epoxy group. The resulting mixture was allowed to stand at room temperature, i.e., approximately 25° C., for one hour and then was heated to 120° C. and maintained thereat for 22–23 hours during which time gelation did not occur. The temperature subsequently was raised to 160° C. for an additional six-hour period. Upon cooling to room temperature, an amber, soft, flexible product was obtained.

Example 23

A mixture was prepared from 1.1 grams of divinylbenzene dioxide (74 weight percent purity) and 1.2 grams of benzoic acid. This mixture provided 1.0 carboxyl group per epoxy group. The resulting mixture was allowed to stand at room temperature, i.e., approximately 25° C., for one hour and then was heated to 120° C. and maintained thereat for 22–23 hours during which time gelation did not occur. The temperature subsequently was raised to 160° C. for an additional six-hour period. Upon cooling to room temperature, an amber, soft, tacky product was obtained.

Example 24

A mixture was prepared from 1.1 grams of divinylbenzene dioxide (74 weight percent purity) and 0.6 gram of acetic acid. This mixture provided 1.0 carboxyl group per epoxy group. The resulting mixture was allowed to stand at room temperature, i.e., approximately 25° C. for one hour and then was heated to 120° C. and maintained thereat for 35 hours during which time gelation did not occur. The temperature subsequently was raised to 160° C. for an additional six-hour period. Upon cooling to room temperature, an amber, highly viscous liquid was obtained.

*Example 25*

A mixture was prepared from 1.1 grams of divinylbenzene dioxide (74 weight percent purity) and 0.9 gram of butyric acid. This mixture provided 1.0 carboxyl group per epoxy group. The resulting mixture was allowed to stand at room temperature, i.e., approximately 25° C., for one hour and then was heated to 120° C. and maintained thereat for 35 hours during which time gelation did not occur. The temperature subsequently was raised to 160° C. for an additional six-hour period. Upon cooling to room temperature, an amber, viscous liquid was obtained.

*Example 26*

A mixture was prepared from 1.1 grams of divinylbenzene dioxide (74 weight percent purity) and 0.73 gram of adipic acid. This mixture provided 1.0 carboxyl group per epoxy group. The resulting mixture was heated to 120° C. for a period of time of two minutes, and upon cooling to room temperature, i.e., approximately 25° C., a solid product was obtained. The resulting solid product was dissolved in 5.0 grams of methyl isobutyl ketone at 100° C., and an iron panel or strip was dipped into the resulting solution. The iron panel was removed almost immediately from this solution, allowed to air dry for 15 minutes, followed by baking said panel at 160° C. for 15 minutes. A thin coating was observed on that portion of the iron panel which was dipped into the methyl isobutyl ketone-containing solution. The resulting coating on the panel was glossy, pale yellow, and tough. The coating displayed excellent adhesion to the panel.

*Example 27*

A mixture was prepared from 1.1 grams of divinylbenzene dioxide (74 weight percent purity) and 0.5 gram of sebacic acid. This mixture provided 0.5 carboxyl group per epoxy group. To this mixture one drop of 5.0 weight percent aqueous solution of $H_2SO_4$ was added. The resulting mixture was heated to 100° C., at which temperature gelation immediately occurred. The same procedure employing identical amounts as above was repeated except no $H_2SO_4$ catalyst was added to the mixture. Gelation in this instance occurred after maintaining the control mixture at 100° C. for 50 minutes.

Reasonable variations and modifications of this invention can be made or carried out in the light of the above disclosure without departing from the spirit and scope thereof.

What is claimed is:

1. A curable composition comprising (a) divinylbenzene dioxide; (b) a polycarboxylic acid in an amount having $y$ carboxyl equivalents per epoxy equivalent of diepoxide; and (c) a polycarboxylic acid anhydride in an amount having $x$ carboxyl equivalents per epoxy equivalent of diepoxide; wherein $y$ is a number in the range from about 0.3 to 1.25; $x$ is a number in the range from 0.0 to 0.75; the sum of $y$ plus $x$ is not greater than 1.25; and $x/y$ is less than 1.0.

2. A curable composition comprising (a) divinylbenzened ioxide; (b) a polycarboxylic acid in an amount having $y$ carboxyl equivalents per epoxy equivalent of diepoxide; and (c) a polycarboxylic acid anhydride in an amount having $x$ carboxyl equivalents per epoxy equivalent of diepoxide; wherein $y$ is a number in the range from 0.3 to 1.0; $x$ is a number in the range from 0.0 to 0.5; the sum of $y$ plus $x$ is not greater than 1.0; $x/y$ is less than 1.0.

3. A curable composition comprising (a) divinylbenzene dioxide; (b) a dicarboxylic acid having a melting point below about 250° C. in an amount having $y$ carboxyl equivalents per epoxy equivalent of diepoxide; and (c) a dicarboxylic acid anhydride having a melting point below about 250° C. in an amount having $x$ carboxyl equivalents per epoxy equivalent of diepoxide; wherein $y$ is a number in the range from about 0.3 to 1.25; $x$ is a number in the range from about 0.0 to 0.75; the sum of $y$ plus $x$ is not greater than 1.25; and $x/y$ is less than 1.0.

4. A curable composition comprising (a) divinylbenzene dioxide; (b) a dicarboxylic acid having a melting point below about 250° C. in an amount having $y$ carboxyl equivalents per epoxy equivalent of diepoxide; and (c) a compound selected from the group consisting of an aliphatic dicarboxylic acid anhydride and a cycloaliphatic dicarboxylic acid anhydride which have a melting point below about 250° C. in an amount having $x$ carboxyl equivalents per epoxy equivalent of diepoxide; wherein $y$ is a number in the range from about 0.3 to 1.25; $x$ is a number in the range from 0.0 to 0.75; the sum of $y$ plus $x$ is not greater than 1.25; and $x/y$ is less than 1.0.

5. A curable composition comprising (a) divinylbenzene dioxide; (b) a dicarboxylic acid having a melting point below about 250° C. in an amount having $y$ carboxyl equivalents per epoxy equivalent of diepoxide; and (c) an aromatic dicarboxylic acid anhydride having a melting point below about 250° C. in an amount having $x$ carboxyl equivalents per epoxy equivalent of diepoxide; wherein $y$ is a number in the range from about 0.3 to 1.25; $x$ is a number in the range from 0.0 to 0.75; the sum of $y$ plus $x$ is not greater than 1.25; and $x/y$ is less than 1.0.

6. A curable composition comprising divinylbenzene dioxide and adipic acid in an amount having from about 0.3 to 1.25 carboxyl equivalents per epoxy equivalent of diepoxide.

7. A curable composition comprising divinylbenzene dioxide and glutaric acid in an amount having from about 0.3 to 1.25 carboxyl equivalents per epoxy equivalent of diepoxide.

8. A curable composition comprising divinylbenzene dioxide and sebacic acid in an amount having from about 0.3 to 1.25 carboxyl equivalents per epoxy equivalent of diepoxide.

9. A curable composition comprising divinylbenzene dioxide and maleic acid in an amount having from about 0.3 to 1.25 carboxyl equivalents per epoxy equivalent of diepoxide.

10. A curable composition comprising divinylbenzene dioxide and succinic acid in an amount having from about 0.3 to 1.25 carboxyl equivalents per epoxy equivalent of diepoxide.

11. A curable composition comprising (a) divinylbenzene dioxide; (b) a polycarboxylic acid in an amount having $y$ carboxyl equivalents per epoxy equivalent of diepoxide; and (c) a polycarboxylic acid anhydride in an amount having $x$ carboxyl equivalents per epoxy equivalent of diepoxide; wherein $y$ is a number in the range from about 0.3 to 1.25; $x$ is a number in the range from 0.0 to 0.75; the sum of $y$ plus $x$ is not greater than 1.25; and $x/y$ is less than 1.0, said curable composition being dissolved in an organic solvent, the resulting solution comprising from about 10 to about 90 weight percent of said curable composition, based on the total weight of curable composition and solvent.

12. A curable composition comprising (a) divinylbenzene dioxide; (b) a polycarboxylic acid in an amount having $y$ carboxyl equivalents per epoxy equivalent of diepoxide; and (c) a polycarboxylic acid anhydride in an amount having $x$ carboxyl equivalents per epoxy equivalent of diepoxide; wherein $y$ is a number in the range from about 0.3 to 1.25; wherein $x$ is a number in the range from 0.0 to 0.75; the sum of $y$ plus $x$ is not greater than 1.25; and $x/y$ is less than 1.0; and (d) a catalytic quantity of an acid catalyst.

13. Thermosetting intermediate reaction products obtained under the influence of heat and by the partial reaction of a composition comprising divinylbenzene dioxide and a polycarboxylic acid, said composition containing from about 0.3 to about 1.25 carboxyl equivalent of said polycarboxylic acid per epoxy equivalent of divinylbenzene dioxide, said intermediate reaction products being dissolved in an organic solvent, the resulting solution comprising from about 10 to about 90 weight percent of said intermediate reaction products, based on the total weight of said intermediate reaction products and solvent.

14. Thermosetting intermediate reaction products obtained by the partial reaction of the composition of claim 1 under the influence of heat.

15. The polymerized, cured product obtained by heating the composition of claim 1.

16. Thermosetting intermediate reaction products obtained by the partial reaction of the composition of claim 2 under the influence of heat.

17. The polymerized, cured product obtained by heating the composition of claim 2.

18. The polymerized, cured product obtained by heating the composition of claim 3.

19. The polymerized, cured product obtained by heating the composition of claim 4.

20. The polymerized, cured product obtained by heating the composition of claim 5.

21. The polymerized, cured product obtained by heating the composition of claim 6.

22. The polymerized, cured product obtained by heating the composition of claim 7.

23. The polymerized, cured product obtained by heating the composition of claim 8.

24. The polymerized, cured product obtained by heating the composition of claim 9.

25. The polymerized, cured product obtained by heating the composition of claim 10.

References Cited in the file of this patent

UNITED STATES PATENTS

| | | |
|---|---|---|
| 2,623,023 | Koroly | Dec. 23, 1952 |
| 2,712,535 | Fisch | July 5, 1955 |
| 2,720,500 | Cody | Oct. 11, 1955 |
| 2,764,575 | Kohler et al. | Sept. 25, 1956 |

OTHER REFERENCES

Everett et al.: "Journ. Chem. Soc." (1950), pages 3131–3135. (Copy in Scientific Library.)